Aug. 3, 1954
H. W. BLACK
2,685,456
HITCHING ATTACHMENT FOR TRACTORS
Filed Nov. 23, 1951
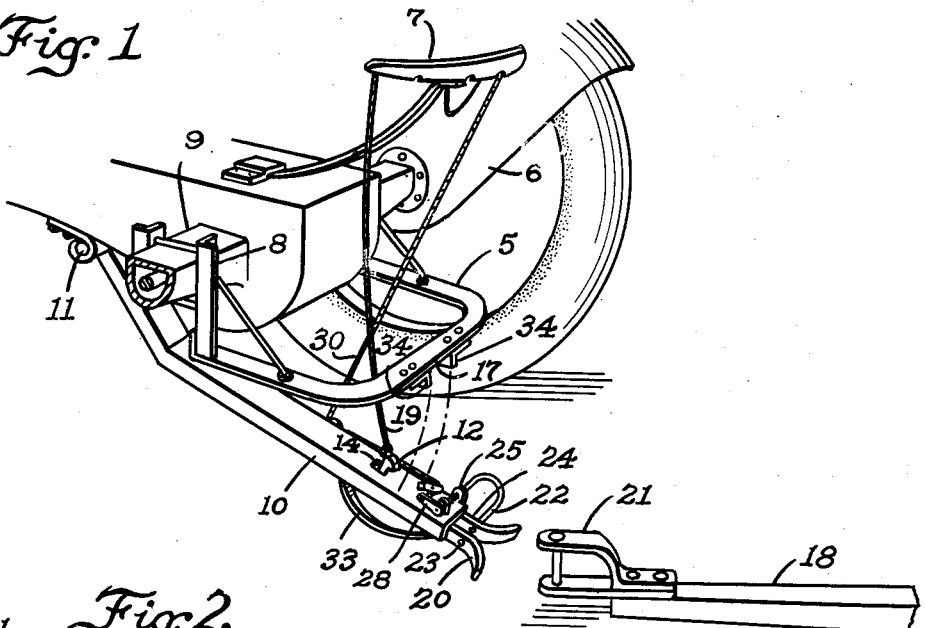
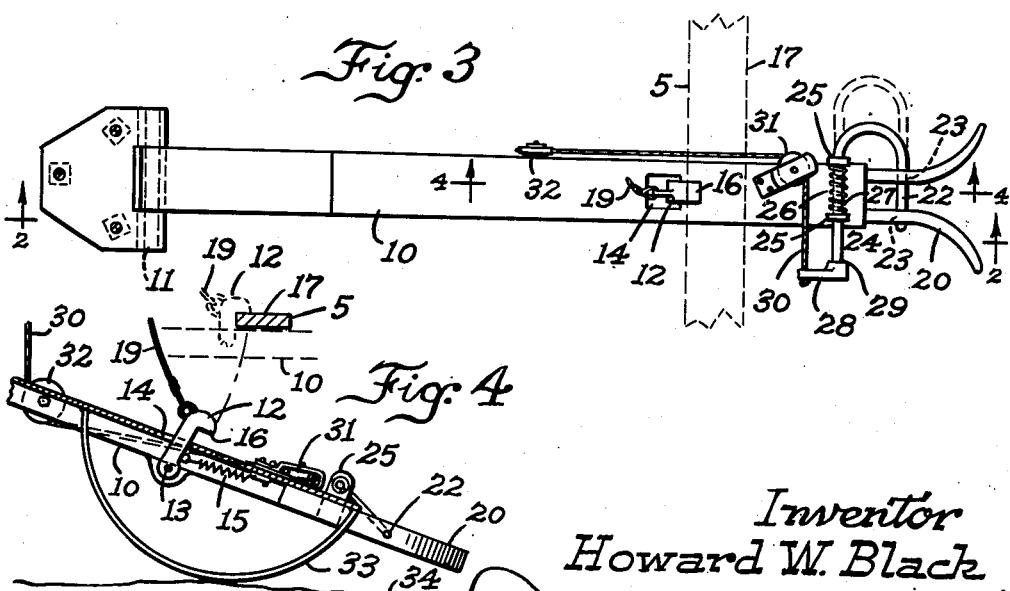
Inventor
Howard W. Black Patented Aug. 3, 1954

2,685,456

UNITED STATES PATENT OFFICE 2,685,456

HITCHING ATTACHMENT FOR TRACTORS

Howard W. Black, Rockford, Ill.

Application November 23, 1951, Serial No. 257,795

15 Claims. (Cl. 280—478)

This invention relates to hitching attachments for tractors, and is more particularly concerned with one designed to permit the coupling and raising to operative position of the reclining tongue of a wagon or implement without necessitating the driver getting off the tractor.

In the hitch of my invention, an auxiliary drawbar is hinged in relation to the conventional drawbar of the tractor on a horizontal axis, to swing upwardly from a reclining position to interlocking relationship to the main drawbar, and has a sled runner under the rear end portion adapted to skid on the ground, keeping the coupler end of the auxiliary drawbar raised only slightly so as not to interfere with the hitching operation and yet sufficiently to prevent its becoming embedded in the ground when the tractor is backed up to the tongue to be hitched. The hitch pin that is slidable transversely of the coupling end of the auxiliary drawbar is spring pressed toward its operative position, and has a rope extending from it permitting manual operation thereof from the tractor seat in hitching and unhitching. The latch for releasably locking the auxiliary drawbar in the raised position is also spring pressed in one direction, so as to lock automatically when the wagon or implement that has been hitched is pulled, causing the tongue and auxiliary drawbar to swing upwardly together to a substantially horizontal position, the latch being also operable by means of a rope from the driver's seat when the auxiliary drawbar is to be lowered to the hitching position.

The invention is illustrated in the accompanying drawing, in which:

Fig. 1 is a perspective view of the rear end portion of a tractor showing a hitching attachment, made in accordance with my invention, applied thereto and indicating the mode of operation;

Fig. 2 is a diagrammatic view taken on the line 2—2 of Fig. 3, indicating how the auxiliary drawbar and reclining tongue are adapted to swing upwardly to the horizontal operative position after the hitching operation in the initial pull;

Fig. 3 is a plan view of the auxiliary drawbar, and

Fig. 4 is a section on the line 4—4 of Fig. 3 with the auxiliary drawbar in the position shown in Fig. 1.

The same reference numerals are applied to corresponding parts throughout the views.

Referring to the drawing, the reference numeral 5 designates a more or less conventional drawbar extending rearwardly from the back of a tractor 6 below the driver's seat 7, the drawbar 5 being secured, as indicated at 8, to the rear axle housing 9. 10 is the auxiliary drawbar provided in accordance with my invention, which is hinged in relation to the main drawbar 5 at its front end on a horizontal axis, as indicated at 11, to be swingable up and down below the drawbar 5, a latch 12 being provided on the auxiliary drawbar 10 near the rear end thereof, to lock the auxiliary drawbar releasably to the main drawbar in the raised operative position, indicated in dotted lines in Fig. 2. The auxiliary drawbar 10 is made of channel iron disposed with its web portion uppermost. The hinge pin 11, previously mentioned, extends through the flanges of the channel. The latch 12 is pivoted at its lower end on a crosspin 13 supported on the flanges of the channel and projects through a slot 14 in the web of the channel, and has a coiled tension spring 15 attached at one end to the drawbar and at the other end to the latch to urge it normally rearwardly to locking position, such rearward movement being limited by the slot 14, so that the toothed end 16 of the latch, the front top portion of which is rounded, as shown, is spaced properly in fore and aft relationship to the transverse portion 17 of the main drawbar 5, to be forced out of the way by cam action as the rounded top of the latch rides over the rear edge of portion 17 of drawbar 5 and interlocked therewith automatically when the drawbar 10 is raised to the substantially horizontal dotted line position shown in Figs. 2 and 4. This upward movement of the drawbar 10 occurs entirely automatically after it has been hitched to the tongue 18 of the wagon or implement and the tractor moves forward to pull the wagon or implement, as illustrated diagrammatically in Fig. 2, the hitching occurring with the drawbar 10 in a lowered or reclining position, the same as the tongue 18, as will soon appear. A rope 19 extends from the back of the toothed end 16 of the latch 12 to the driver's seat 7, and in that way the latch can be released by the driver without getting off the seat by a pull on the rope when the auxiliary drawbar 10 is to be dropped to the hitching position, shown in Fig. 1.

On the rear coupling end of the auxiliary drawbar 10 is a V-fork 20, into which the clevis 21 on the end of the tongue 18 of the wagon or implement to be drawn is adapted to be easily guided for connection with the drawbar on the spring pressed hitch pin 22. The latter is generally U-shaped and has one end portion slidable in aligned holes 23 provided in the opposite sides of the parallel inner end portions 24 of the fork 20, the other parallel end portion of the U-shaped pin 22 being slidably guided in a pair of lugs 25 projecting upwardly from the web portion of the channel of the drawbar 10. A coiled compression spring 26 surrounds the last mentioned end portion of the pin 22 between the lugs 25 and bears at one end against the one lug 25 and at the other end against a cross-pin 27 mounted in the pin 22, so as to hold the pin 22 normally in the full-line operative position shown in Fig. 3, but permit retracting movement to the dotted line position where the one end portion of the pin 22 remains engaged in only one of the two holes 23, so that the clevis 21 may enter or leave the fork 20 in hitching or unhitching. An arm 28 is attached to the projecting end portion 29 of the pin 22, and has a rope 30 connected thereto and extending to the driver's seat 7, so that the hitching pin 22 may be retracted manually in hitching and unhitching. Pulleys 31 and 32 are mounted on the drawbar 10 in planes in right angle relationship to one another, and the rope 30 is guided on these pulleys so that an upward pull on the rope at the driver's seat 7 results in a horizontal pull on that end attached to the arm 28 in a direction parallel to the guides 25—25 and 23—23.

A bowed sled runner or skid 33 is provided on the underside of the auxiliary drawbar 10 near the rear end thereof in a substantially vertical plane, to slide on the ground 34 and support the fork 20 off the ground, so that it will not dig in when the tractor is being backed up in the hitching operation, but close enough to the ground to enable easy hitching connection with the clevis 21 on the reclining end of the tongue 18.

In operation, the driver, when about to hitch a wagon or implement onto the tractor, maneuvers the tractor into position in front of the tongue 18 of the wagon or implement and releases the latch 12 by a pull on the rope 19, so that the auxiliary drawbar 10 drops to the hitching position. Then the tractor is backed up so as to enter the clevis 21 in the fork 20, the driver meanwhile pulling the rope 30, so as to retract the hitch pin 22 to allow the clevis 21 to be entered all the way. The driver releases the rope 30 to permit the hitch pin 22 to slide home under action of the spring 26. All of this, it will be noted, is done without the driver having to get off the tractor and without having to go through any part of the laborious procedure that was otherwise involved, where it was necessary to reconcile the improper positioning of the wagon tongue in relation to the tractor drawbar, especially when the wagon happened to be loaded heavily and it required considerable force to move the tongue by hand. With the present attachment, once the hitch pin 22 is coupled to the clevis 21, the rest of the operation is entirely automatic, because the drawbar 10 will swing upwardly and be latched at 12 onto the drawbar 5 as soon as the tractor starts to move forwardly. Angle plates 34 projecting from the bottom of the drawbar 5 on opposite sides of the drawbar 10 assume the side thrust in the pulling of the wagon or implement, thereby relieving the hinge pin 11 of strain.

It is believed the foregoing description conveys a good understanding of the objects and advantages of my invention. The appended claims have been drawn to cover all legitimate modifications and adaptations.

I claim:

1. In combination with a tractor having a transversely extending member on the rear thereof, a drawbar pivotally secured at one end to the tractor forwardly relative to the rear member and swingable at its free rear end upwardly from a reclining position toward and into abutment with the bottom of said rear member, an elongated latch pivoted at one end on an axis transversely of the drawbar forwardly from the rear end and extending upwardly therefrom and having a tooth on the upper end arranged to engage a keeper on the rear member for support of the drawbar in raised position, a spring urging said latch in a locking direction so that it automatically locks on the keeper when the drawbar reaches raised position, said latch being manually releasable, the drawbar when released being free to gravitate to the reclining position for coupling at its free end onto the free end of a similarly reclining tongue of a wagon or implement and being adapted to swing upwardly automatically to abutment with the rear member when the drawbar is coupled onto and transmits pull to such a wagon or implement tongue, and coupling means on the free end of said drawbar.

2. In combination with a tractor having a transversely extending member on the rear thereof, a drawbar pivotally secured at one end to the tractor forwardly relative to the rear member and swingable at its free rear end upwardly from a reclining position toward and into abutment with the bottom of said rear member, an elongated latch pivoted at one end on an axis transversely of the drawbar forwardly from the rear end and extending upwardly therefrom and having a tooth on the upper end arranged to engage a keeper on the rear member for support of the drawbar in raised position, a spring urging said latch in a locking direction so that it automatically locks on the keeper when the drawbar reaches raised position, said latch being manually releasable, the drawbar when released being free to gravitate to the reclining position for coupling at its free end onto the free end of a similarly reclining tongue of a wagon or implement and being adapted to swing upwardly automatically to abutment with the rear member when the drawbar is coupled onto and transmits pull to such a wagon or implement tongue, means on the free end portion of said drawbar arranged to rest and run on the ground in the movement of the tractor so as to support the free end of the drawbar off the ground but close enough to it for coupling purposes, and coupling means on the free end of said drawbar.

3. In combination with a tractor having a transversely extending member on the rear thereof, a drawbar pivotally secured at one end to the tractor forwardly relative to the rear member and swingable at its free rear end upwardly from a reclining position toward and into abutment with the bottom of said rear member, an elongated latch pivoted at one end on an axis transversely of the drawbar forwardly from the rear end and extending upwardly therefrom and having a tooth on the upper end arranged to engage a keeper on the rear member for support of the drawbar in raised position, a spring urging said latch in a locking direction so that it automatically locks on the keeper when the drawbar reaches raised position, the top of the toothed portion of the latch being cam-shaped and arranged to slide on the keeper in the final portion of the upward movement of the drawbar to raised position whereby to cam the latch in a direction against the action of said spring until the toothed portion reaches locking position relative to the keeper whereupon it moves into engagement with the keeper under spring pressure, said latch being manually releasable, the drawbar when released being free to gravitate to the reclining position for coupling at its free end onto the free end of a similarly reclining tongue of a wagon or implement and being adapted to swing upwardly automatically to abutment with the rear member when the drawbar is coupled onto and transmits pull to such a wagon or implement tongue, and coupling means on the free end of said drawbar.

4. In combination with a tractor having a transversely extending member on the rear thereof, a drawbar pivotally secured at one end to the tractor forwardly relative to the rear member and swingable at its free rear end upwardly from a reclining position toward and into abutment with the bottom of said rear member, manually disengageable latch means operative with the drawbar raised into abutment with the bottom of said rear member releasably interconnecting the rear member with the drawbar to support the latter in such raised position, the drawbar when said latch means is released being free to gravitate to the reclining position for coupling at its free end onto the free end of a similarly reclining tongue of a wagon or implement, said drawbar being adapted to swing upwardly automatically to abutment with the rear member when the tractor moves forward with the drawbar coupled onto and transmitting pull to such a wagon or implement tongue, laterally spaced side thrust abutments on the bottom of said rear member between which the drawbar is closely disposed in raised position so as to relieve the drawbar pivot of lateral strain during the pulling of a wagon or implement and transmit such strain to the rear member and thence to the tractor, and coupling means on the free end of said drawbar connectable with the end of a tongue by backing the tractor toward the tongue with the drawbar in reclining position.

5. In combination with a tractor having a transversely extending member on the rear thereof, a drawbar pivotally secured at one end to the tractor forwardly relative to the rear member and swingable at its free rear end upwardly from a reclining position toward and into abutment with the bottom of said rear member, manually disengageable means releasably interconnecting the rear member with the drawbar intermediate the ends of the latter, the drawbar when released being free to gravitate to the reclining position for coupling at its free end onto the free end of a similarly reclining tongue of a wagon or implement and being adapted to swing upwardly automatically to abutment with the rear member when the drawbar is coupled onto and transmits pull to such a wagon or implement tongue, laterally spaced side thrust abutments on the bottom of said rear member between which the drawbar is closely disposed in raised position so as to relieve the drawbar pivot of lateral strain during the pulling of a wagon or implement and transmit such strain to the rear member and thence to the tractor, means on the free end portion of said drawbar arranged to rest and run on the ground in the movement of the tractor so as to support the free end of the drawbar off the ground but close enough to it for coupling purposes, and coupling means on the free end of said drawbar.

6. For attachment to a tractor having a drawbar extending transversely of the rear end thereof, a hitch comprising an auxiliary drawbar disposed in right angle relationship to and below said drawbar and adapted to be pivoted at its front end to the tractor in front of the said drawbar, said auxiliary drawbar comprising an elongated channel member disposed with its web uppermost and its flanges downwardly directed, a pivot pin disposed transversely of one end of said auxiliary drawbar extending through registering holes provided in the flanges, the web of said channel having a slot provided therein near the other end of said drawbar, a hook-shaped latch having a shank portion extending down through the slot with freedom for oscillatory movement and pivoted on a crosspin carried on the flanges, a spring urging said latch in one direction to engage the one end of the slot, said latch adapted to be retracted manually to released position against the action of said spring, a coupling fork on the last named end of said drawbar in a plane parallel to the web, and a U-shaped coupling pin, the one end portion of which pin is parallel to the web of the channel and slidable in registering holes provided in the opposite sides of the fork, and the other end portion of which pin is parallel to the first named end portion and slidable in spaced guides provided on the drawbar, the latter end portion of the pin having a coiled compression spring on it compressed between one of the guides and a projection on the pin so as to urge the pin normally toward coupling position, the latter end portion of the pin also having an operating arm carried transversely on its projecting end to which a manually operable rope may be attached for retraction of the pin, said arm by contact with the adjacent guide limiting retracting movement of the pin so it cannot become disengaged from the fork.

7. A hitch attachment as set forth in claim 6 including a pair of pulleys mounted on the drawbar in spaced relation to one another and to the coupling pin, the one nearest the pin being disposed in a plane substantially parallel to the operating arm and the other in a plane at right angles.

8. A hitch attachment as set forth in claim 7 including a bowed sled runner mounted on the underside of the free end portion of the drawbar in a plane at right angles to the web portion.

9. A hitch attachment as set forth in claim 7 wherein the arms of the coupling fork outwardly from the coupling pin extend in diverging relation.

10. In combination with a tractor having a transversely extending member on the rear thereof, a drawbar pivotally secured at one end to the tractor forwardly relative to the rear member and swingable at its free rear end upwardly from a reclining position toward and into abutment with the bottom of said rear member, a latch pivoted on the drawbar on a transverse axis forwardly from the rear end of said drawbar and extending upwardly therefrom and having a tooth on the upper end arranged to engage a keeper on the rear member for support of the drawbar in raised position, said latch being normally urged in the locking direction so that it automatically locks on the keeper when the drawbar reaches a raised position, said latch being manually releasable, the drawbar when released being free to gravitate to the reclining position for coupling at its free end onto the free end of a similarly reclining tongue of a wagon or implement and being adapted to swing upwardly automatically to abutment with the rear member when the drawbar is coupled onto and transmits pull to such a wagon or implement tongue, and coupling means on the free end of said drawbar.

11. In combination with a tractor having a transversely extending member on the rear thereof, a drawbar pivotally secured at one end to the tractor forwardly relative to the rear member and swingable at its free rear end upwardly from a reclining position toward and into abutment with the bottom of said rear member, a latch pivoted on the drawbar on a transverse axis forwardly from the rear end of said drawbar and extending upwardly therefrom and having a tooth on the upper end arranged to engage a keeper on the rear member for support of the drawbar in raised position, said latch being normally urged in the locking direction so that it automatically locks on the keeper when the drawbar reaches a raised position, said latch being manually releasable, the drawbar when released being free to gravitate to the reclining position for coupling at its free end onto the free end of a similarly reclining tongue of a wagon or implement and being adapted to swing upwardly automatically to abutment with the rear member when the drawbar is coupled onto and transmits pull to such a wagon or implement tongue, means on the free end portion of said drawbar arranged to rest and run on the ground in the movement of the tractor so as to support the free end of the drawbar off the ground but close enough to it for coupling purposes, and coupling means on the free end of said drawbar.

12. In combination with a tractor having a transversely extending member on the rear thereof, a drawbar member pivotally secured at one end to the tractor forwardly relative to the rear member and swingable at its free rear end upwardly from a reclining position toward and into abutment with the bottom of said rear member, a latch pivoted on a transverse axis on one of said last mentioned members and extending therefrom and having a tooth on the outer end arranged to engage a keeper on the other of said members for support of the drawbar member in raised position, said latch tending normally to swing to locked position so that it automatically locks on the keeper when the drawbar member reaches raised position, said latch being manually releasable, the drawbar member when released being free to gravitate to the reclining position for coupling at its free end onto the free end of a similarly reclining tongue of a wagon or implement and being adapted to swing upwardly automatically to abutment with the rear member when the drawbar member is coupled onto and transmits pull to such a wagon or implement tongue, and coupling means on the free end of said drawbar member.

13. In combination with a tractor having a transversely extending member on the rear thereof, a drawbar member pivotally secured at one end to the tractor forwardly relative to the rear member and swingable at its free rear end upwardly from a reclining position toward and into abutment with the bottom of said rear member, a latch pivoted on a transverse axis on one of said last mentioned members and extending therefrom and having a tooth on the outer end arranged to engage a keeper on the other of said members for support of the drawbar member in raised position, said latch tending normally to swing to locked position so that it automatically locks on the keeper when the drawbar member reaches a raised position, said latch being manually releasable, the drawbar member when released being free to gravitate to the reclining position for coupling at its free end onto the free end of a similarly reclining tongue of a wagon or implement and being adapted to swing upwardly automatically to abutment with the rear member when the drawbar member is coupled onto and transmits pull to such a wagon or implement tongue, means on the free end portion of said drawbar member arranged to rest and run on the ground in the movement of the tractor so as to support the free end of the drawbar member off the ground but close enough to it for coupling purposes, and coupling means on the free end of said drawbar member.

14. In combination with a tractor having a transversely extending member on the rear thereof, a drawbar in the form of an elongated channel member disposed with its web uppermost and its flanges downwardly directed, a pivot pin disposed transversely of one end of said drawbar extending through registering holes provided in the flanges for pivotally securing that end to the tractor forwardly relative to the rear member so that the drawbar is swingable at its free rear end upwardly from a reclining position toward and into abutment with the bottom of said rear member, the web of said channel having a slot provided therein, a hook-shaped latch having a shank portion extending down through the slot with freedom for oscillatory movement and pivoted on a cross pin carried on the flanges, a spring urging said latch in one direction to engage one end of the slot, said latch adapted to be retracted manually to released position against the action of said spring, the drawbar when released being free to gravitate to the reclining position for coupling at its free end onto the free end of a similarly reclining tongue of a wagon or implement and being adapted to swing upwardly automatically to abutment with the rear member when the drawbar is coupled onto and transmits pull to such a wagon or implement tongue and coupling means on the free end of said drawbar secured to the flanges.

15. A hitch attachment as set forth in claim 14 including a bowed sled runner mounted on the underside of the free end portion of the drawbar in a plane at right angles to the web portion.

References Cited in the file of this patent

UNITED STATES PATENTS

| Number | Name | Date |
|---|---|---|
| 2,194,087 | Jager | Mar. 19, 1940 |
| 2,320,168 | Benjamin et al. | May 25, 1943 |
| 2,375,970 | Williams | May 15, 1945 |
| 2,464,424 | Weldon | Mar. 15, 1949 |
| 2,583,840 | Hawkins et al. | Jan. 29, 1952 |